United States Patent [19]

Balatoni

[11] Patent Number: 5,917,814
[45] Date of Patent: *Jun. 29, 1999

[54] SLC-96 PLUG-IN MULTIPLEXER

[75] Inventor: Nicholas A. Balatoni, Santa Clara, Calif.

[73] Assignee: Raychem Corporation, Menlo Park, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/408,020

[22] Filed: Mar. 20, 1995

[51] Int. Cl.⁶ .................................................. H04M 1/24
[52] U.S. Cl. ............................................................. 370/352
[58] Field of Search .................................... 370/58.1, 112, 370/60, 60.1, 94.1, 94.2, 94.3, 85.13, 85.1, 58.2, 29, 31, 32, 58.3, 118, 110.1, 66, 11, 42, 77, 67, 81, 80, 68, 76, 111, 294, 280, 351, 352, 359, 357, 355, 376, 375, 387, 388, 386, 377, 342, 442, 420, 522, 524, 276, 296; 379/210, 93, 157, 201, 14, 15, 33, 1, 27, 333, 32, 335, 339; 375/357, 362

[56] References Cited

U.S. PATENT DOCUMENTS

| | | | |
|---|---|---|---|
| 4,730,312 | 3/1988 | Johnson et al. | 370/523 |
| 5,195,125 | 3/1993 | Bliven et al. | 379/29 |
| 5,347,566 | 9/1994 | Lax et al. | 379/27 |
| 5,495,470 | 2/1996 | Tyburski et al. | 379/33 |
| 5,627,833 | 5/1997 | Bliven | 370/464 |

FOREIGN PATENT DOCUMENTS

| | | | |
|---|---|---|---|
| WO 91/01600 | 2/1991 | WIPO . | |
| WO 93/09612 | 5/1993 | WIPO | H04B 3/46 |

OTHER PUBLICATIONS

Luniewicz et al., "The SLC 96 Subscriber Loop Carrier System: Channel Bank," *AT&T Bell Laboratories Technical Journal*, vol. 63, No. 10, Dec. 1984, pp. 2283–2331.

Peck et al., "Evolution of Integrated Digital Loop Carrier," *IEEE Global Telecommunications Conference*, Phoenix, Arizona, Dec. 2–5, 1991, pp. 2092–2099.

McDonald, "An Integrated Subscriber Carrier and Local Digital Switching System," The International Symposium on Subscriber Loops and Services, Atlanta, Georgia, Mar. 20–24, 1978, pp. 172–177.

*Primary Examiner*—Dang Ton
*Attorney, Agent, or Firm*—David G. Beck; Townsend and Townsend and Crew

[57] ABSTRACT

A system for use with a subscriber line carrier such as a SLC-96. The system provides a multiplex channel unit 10 that inputs T1 line signals, and outputs multiple telephone line signals in a format such as 2B1Q over a twisted pair 13 to an RT 35. The RT 35 converts the full duplex multiplexed signals to analog service for a subscriber 12.

34 Claims, 14 Drawing Sheets

Microfiche Appendix Included
(2 Microfiche, 173 Pages)

SLC-96 PLUG-IN MULTIPLEXER

CROSS-REFERENCE TO RELATED APPLICATIONS

This application is related to International Publication No. WO 91/01600, published Feb. 7, 1991, and to U.S. Pat. No. 5,111,497, issued May 5, 1992 to Bliven et al., both of which are completely incorporated herein by reference for all purposes. This application is also related to Application Ser. No. 08/408,585, now U.S. Pat. No. 5,668,814 (Attorney Docket No. 13009-002100/MP1527-US1) and to Application Ser. No. 08/408,610 (Attorney Docket No. 13009-002500/MP1549-US1) now U.S. Pat. No. 5,610,922 both filed on the same day as the present application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

MICROFICHE APPENDIX

This application includes a microfiche of Appendices 1, 2 and 3, having two sheets totaling 173 frames.

BACKGROUND OF THE INVENTION

The present invention relates to the field of telecommunications equipment. More specifically, in one embodiment the invention provides an improved method and device for providing multiple analog telephone lines from telephone company equipment such as a subscriber loop carrier (SLC) system to customer premises.

One of the best known SLC systems, known as the SLC-96, is manufactured by AT&T. The SLC-96 is a digital subscriber carrier system that provides conventional telephone service, or plain old telephone services (POTS), for up to 96 subscriber lines. These types of systems use time division multiplexing techniques for transmission of signals.

FIG. 1 is a general block diagram of the basic SLC-96 system, or the like. As shown, the system provides for the use of central office switches 2, which may be digital or analog switches, to transmit up to 96 analog signals to a SLC-96 central office terminal (SLC-96 COT) 4. SLC-96 COT 4 receives and converts the analog signals to T1 digital format for transmission over anywhere from one to four T1 lines. The number of T1 lines will depend, inter alia, on the operation mode. An additional T1 protection line may be used to increase service availability. The T1 signals are transmitted to a SLC-96 remote terminal (SLC-96 RT) 6. SLC-96 RT 6 receives and converts the T1 digital signals into up to 96 analog telephone signals for transmission to subscriber equipment $12_i$. Of course, the process operates in reverse to allow subscriber equipment $12_i$ to transmit analog telephone signals to central office switches 2. The SLC-96 system is described in detail in a variety of publications including, for example, Luniewicz et al., "The SLC-96 Subscriber Loop Carrier System," *AT&T Bell Laboratories Technical Journal* (1984) Vol. 63, which is incorporated by reference in its entirety for all purposes. A specific application of a SLC-96 is described in "Retrofit Subscriber Loop Carrier System With Improved Performance Monitoring And Remote Provisioning," U.S. Pat. No. 5,347,566 issued on Sep. 13, 1994 to Law et al., which also is incorporated by reference in its entirety for all purposes.

Another variation of a SLC type system operates as described above but without SLC-96 COT 4. This type of system instead includes SLC-96 RT 6 coupled via a T1 line (a digital trunk interface) to a digital switching exchange. SLC type systems may also be adapted to provide digital data such as for 4-wire digital data services (DDS) by use of an OCU/dataport channel unit.

SLC-96 RT 6 includes a common backplane 8, and shelf space for up to 48 double card width plug-in SLC-96 dual-circuit channel units $10_i$. Each dual-circuit channel unit $10_i$ provides two VF channels, each VF channel being a 64 kbits/sec (kbps) signal corresponding to an analog telephone connection.

Backplane 8 includes the bus arrangement for accessing data in the T1 digital signals, and also includes a 1.544 MHz clock signal (RCLK). In particular, backplane 8 includes pulse amplitude modulation (PAM) buses, one for transmit (TPAM) and one for receive (RPAM), as well as pulse code modulation (PCM) buses, commonly accessible by channel units $10_i$. Backplane 8 also is compatible for use, for example, with OCU/dataport channels to provide 4-wire DDS. In addition, backplane 8 includes a bus TNEN that provides channeltype information, where TNEN pulls high for digital data or low for PAM signals indicating the channel-type for a time slot associated with a channel position. Backplane 8 has common buses for providing timing, synchronization, and telephone company power to channel units $10_i$. Channel units $10_i$ interface with the TPAM and RPAM buses in their designated time slots, each time slot corresponding, for example, to a 64 kbps VF channel. With respect to one T1 line, for example, the T1 bitstream on backplane 8 is arranged as 24 8-bit bytes (one byte per VF channel) plus one framing bit, i.e. a 193rd bit used for frame alignment to the T1 signal. This framing bit is not available as a separate signal in backplane 8. However, backplane 8 provides signals that indicate when the transmit and receive time slots are active for the two VF channels of a particular channel unit $10_i$. Each channel unit $10_i$ is coupled to two subscriber lines. Each subscriber line is provided with separate analog twisted pair line $11_i$. Thus, channel units $10_i$ collectively transmit 96 analog telephone signals over 96 twisted pair lines to their respective subscriber equipment $12_i$.

SLC-96 RT 6 would be placed, for example, in a rapidly growing suburban or rural area, any location where many customers are concentrated and telephone service demand exists, or wherever the telephone company requires. When deployed without SLC-96 COT 4, i.e. via direct T1 link into the digital switch, SLC-96 RT 6 can be located at any point between the central office and the customer, such as in the basement or the like of a high-rise building in a metropolitan area.

As customer demand rises, and as the service area expands geographically, it is desirable and economical for telephone companies to save expensive copper by reducing the number of twisted pair lines, while providing or maintaining telephone service to customers. Furthermore, telephone companies may desire to provide service where otherwise they could not, due to a lack of copper twisted pair lines between SLC-96 RT 6 and a customer location. In particular, when confronted with customer demand for service and inadequate numbers of existing twisted pair lines to meet the demand in that geographical area, telephone companies are faced with the difficult prospect of either not providing service or providing service by implementing alternative transmission links via microwave, radio, or the like, or by laying new cable. Providing service by either of these means can be labor intensive, very time consuming, unreliable and/or expensive.

It is desirable to reduce the copper (i.e., the number of twisted pair lines) necessary for the provision of telephone services to subscribers. In addition, efficiently and inexpensively providing telephone services to customers located where, for example, there is a lack of existing twisted pairs to provide service from an existing SLC-96 RT 6, is needed. Operational and testing compatibility, as well as ease, speed, and flexibility of installation, with new or existing SLC-96 systems or the like are also desirable.

SUMMARY OF THE INVENTION

An improved system for economically and efficiently providing analog telephone service, for example, in cooperation with a SLC-96 system or other similar system is provided by virtue of the present invention. In a preferred embodiment, the invention enables the provision of analog telephone service to a large number of subscribers, but at a cost savings. Among other items, cost is saved as a result of a reduction of the number of twisted pairs normally required by a SLC-96 system. In addition, the invention provides the ability to expand service to customers in locations where a lack of existing twisted pairs to the location makes it difficult and expensive to provide services. The invention further is able to be installed quickly and easily by plug-in to any SLC-96 RT and is compatible with new or existing SLC-96 systems or the like, as well as SLC-96 testing procedures.

DETAILED DESCRIPTION OF THE PREFERRED EMBODIMENTS

Figure 1:
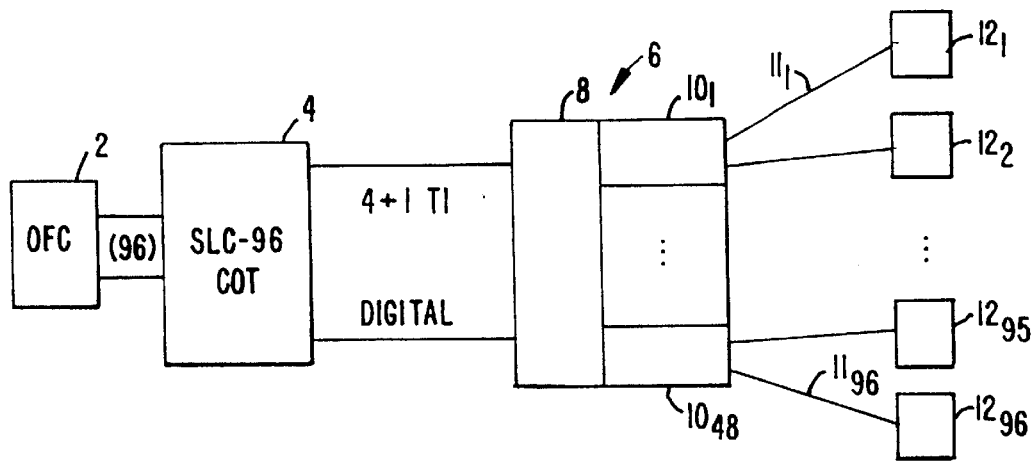
FIG. 1 is a general block diagram of a prior art system.

I. General
II. Data Transmission Hardware
  A. SLC-96 Plug-in Multiplexer Hardware
  B. Remote Terminal Hardware
  C. Remote Terminal Enclosures
III. Software/Microprocessor Functionality
IV. Conclusion
I. General Generally, the system, according to an embodiment of the invention, provides two Message Telephone Services (MTS) (a/k/a POTS lines) over a single copper twisted pair line between multiplexer 25 and RT 35. The system uses, for example, Integrated Services Digital Network (ISDN) 2B1Q line format to transport the analog signals using the ISDN 2B+D arrangement. The ISDN 2B1Q line format supports two 64 kbps voice channels and a single 16 kbps data channel, as well as additional signaling overhead for a total of 160 kbps, over a single twisted pair. The use of an 80 kbps (a/k/a kbaud) 2B1Q signal containing 160 kbps of user information permits the transmission and reception of voice and data signals over extended lengths of twisted pair wires, e.g., 1,000, 15,000, 20,000 feet or more, without smearing, i.e., signal quality over large distances is improved because the lower frequency 80 kbps signal may be more readily separated.

Figure 2:
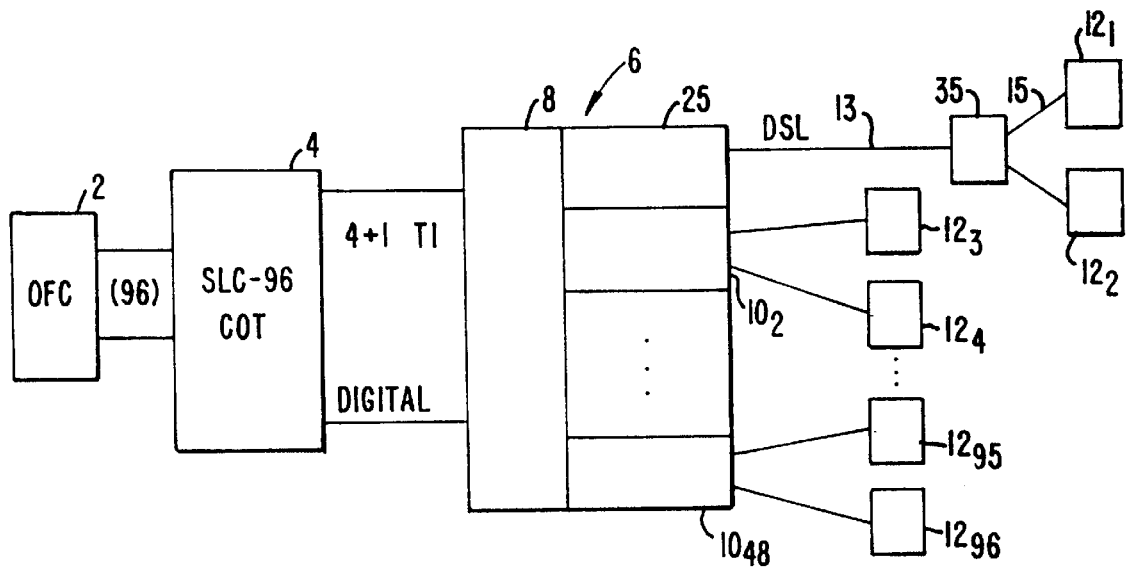
FIG. 2 is an overall illustration of the system herein.

FIG. 2 illustrates a typical SLC system in accordance with an embodiment of the invention. As with a typical SLC-96 system, one or more T1 digital lines provide two-way communications between SLC-96 COT 4 and SLC-96 RT 6. Of course, the invention is illustrated with regard to the T1 transmission standard, but will find applicability to other standards such as E1. Any analog or digital central office switch 2 provides communications to SLC-96 COT 4. Typically, SLC-96 RT 6 includes a conventional backplane 8 and has capacity for up to 48 shelved double card width dual-circuit channel units $10_i$. Each channel unit $10_i$ corresponds, for example, to two VF channels for use by respective subscriber equipment $12_i$. While the preferred embodiment of the invention is illustrated by way of example with regard to providing two VF channels, other embodiments of the invention may also be implemented to provide digital service as well.

As seen in FIG. 2, a SLC-96 plug-in multiplexer 25 would be placed in, for example, a shelf space normally occupied by a channel unit $10_i$ in SLC-96 RT 6. SLC-96 plug-in multiplexer 25 replaces any dual POTS type shelved channel unit $10_i$ in SLC-96 RT 6, by simply being plugged into a shelf space as desired or needed. The form factor of SLC-96 plug-in multiplexer 25 is the same board height and length as conventional dual-circuit channel unit $10_i$ plug-ins on a shelf in a conventional SLC-96 RT 6. SLC-96 plug-in multiplexer 25 occupies a double card width position or two adjacent single card width positions on a shelf. Additionally, multiplexer 25 has a faceplate including various light emitting diode (LED) indicators for providing the status of multiplexer 25 for installation or removal of multiplexer 25 without disrupting service to customers. Further, the system is testable via access relays in multiplexer 25 to a test bus in backplane 8 through the Pair Gain Test Controller (PGTC) of a conventional SLC-96 system.

FIG. 2, merely by way of example, shows SLC-96 plug-in multiplexer 25 replacing only one shelved channel unit $10_i$, for a 2:1 pair gain savings on copper twisted pair lines. Of course, up to 48 SLC-96 plug-in multiplexers 25 may be used in SLC-96 RT 6, or any combination of channel units $10_i$ and SLC-96 plug-in multiplexers 25 may be used as needed or desired. The maximum usage of the multiplexer 25/RT 35 systems in SLC-96 RT 6 could therefore result in up to a 96:48 pair gain savings on twisted pair lines. Additionally, SLC-96 plug-in multiplexer 25 may also be used in SLC-96 RT 6 for other SLC type systems which, for example, do not include SLC-96 COT 4 as described in the background.

For each SLC-96 plug-in multiplexer 25 used, a corresponding Remote Terminal (RT) 35 is used. RT 35 is coupled to multiplexer 25 via a single twisted pair line 13 over which the DSL signal travels. Subscriber equipment $12_i$ for two subscriber lines are coupled to RT 35 via respective twisted pair lines 15. RT 35 would be placed in or near, for example, a home, office or other subscriber facility for reception of voice or data signals over the single twisted pair line from multiplexer 25. RT 35 could be located indoors or outdoors, on a pole, wall, equipment closet, or the like. Accordingly, the electronics of RT 35 are preferably enclosed in a protected enclosure installed at subscriber locations.

As will be readily apparent to those of skill in the art, the analog signal for use by a subscriber equipment $12_i$ could be either a voice or data signal. In alternative embodiments, the signals may be used at the subscriber location for video conferencing, using one or both of the subscriber channels transmitted to each subscriber. The invention will be illustrated herein as it applies to multiplexer 25 primarily with regard to incoming signals extracted from backplane 8 by multiplexer 25 for transmission to RT 35 for use by subscriber equipment $12_i$, but the process is similarly applied in reverse to provide voice and data signals from subscriber equipment $12_i$ to RT 35 for transmission to multiplexer 25.

According to an embodiment of the invention, multiplexer 25 interfaces with backplane 8 of SLC-96 RT 6 to extract the appropriate two VF channels from PAM buses in backplane 8. The two extracted VF channels correspond to the two VF channels corresponding to the channel unit $10_i$ that otherwise would occupy the shelf space that multiplexer 25 occupies. Multiplexer 25 then reconstructs the analog signals from extracted PAM signals using PAM codecs, converts the analog signals to binary 8-bit PCM words, then multiplexes the data of one VF channel and the other VF channel into the B1 and B2 channels, respectively, for transport via the 2B1Q Digital Subscriber Line (DSL) signal for transmission to RT 35 over a single twisted pair line.

In an alternative embodiment of the invention, multiplexer 25 interfaces with backplane 8 to extract the appropriate two VF channels from PCM based signals from backplane 8.

RT 35 receives the DSL signal transmitted by multiplexer 25, and demultiplexes the data of the two VF channels for transmission to subscriber equipment $12_i$. Subscriber equipment $12_i$ receive their respective analog signals via the respective twisted pair lines coupled between RT 35 and that subscriber equipment $12_i$. As shown in FIG. 2, not all of the subscriber lines need be converted in a simple SLC-96 to DSL lines. As shown in FIG. 2, some subscribers may still receive services over conventional twisted pair analog lines via conventional channel units $10_i$ inserted in the SLC-96 RT 6.

II. Data Transmission Hardware

A. SLC-96 Plug-in Multiplexer Hardware

Figure 3:
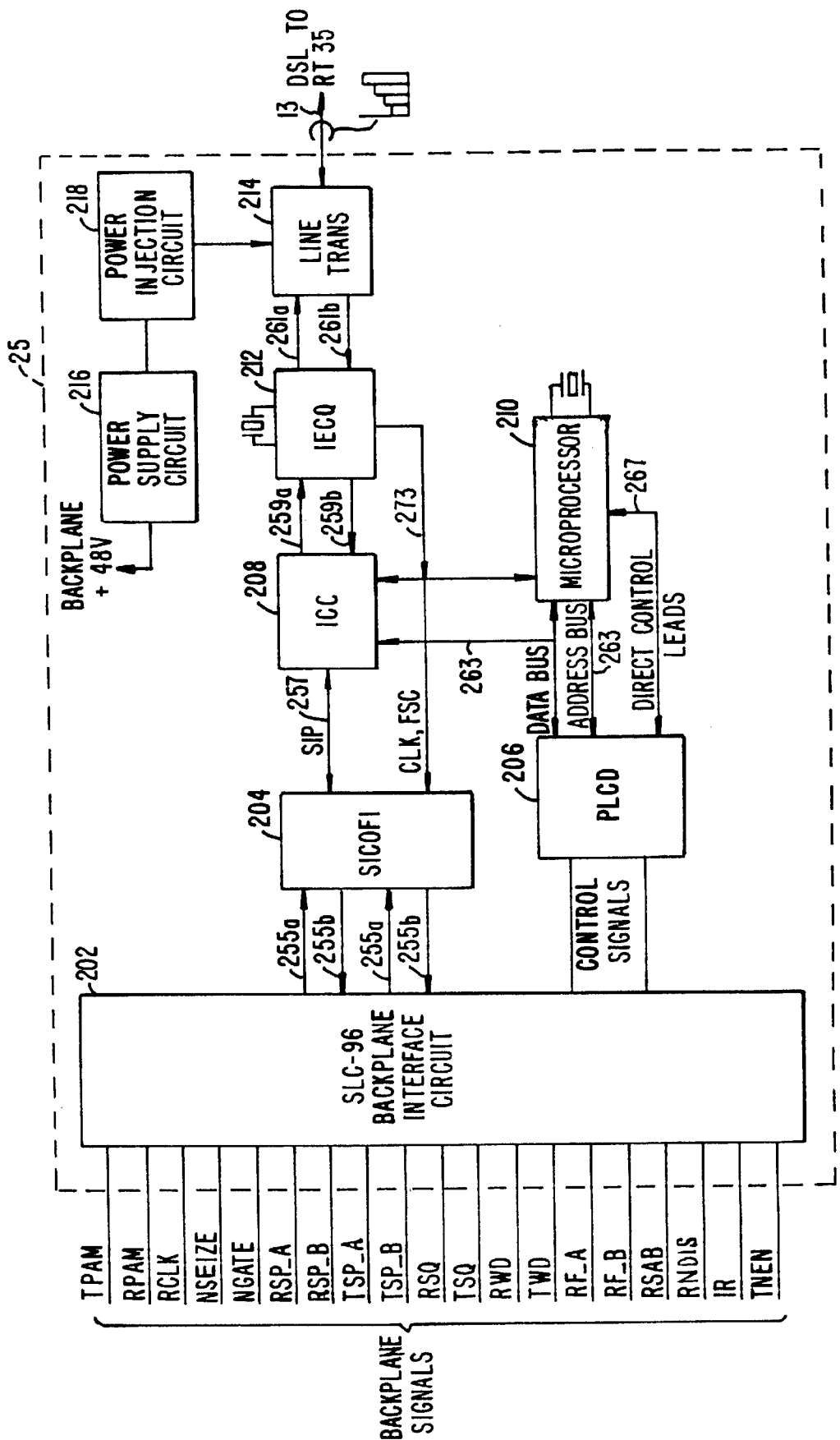
FIG. 3 is a simplified block diagram of SLC-96 plug-in multiplexer 25 according to an embodiment of the invention.

FIG. 3 is a simplified block diagram of multiplexer 25. Multiplexer 25 includes a SLC-96 backplane interface circuit (interface circuit) 202, a dual channel signaling codec filter (SICOFI) 204, a programmable logic control device (PLCD) 206, an ISDN Communications Controller (ICC) chip 208, a microprocessor 210, an ISDN Echo Cancellation-Quaternary (IECQ) chip 212, a line transformer 214, a power supply circuit 216, and a power injection circuit 218.

Interface circuit 202 is coupled to backplane 8 and provides the interface for data and control signals between multiplexer 25 and backplane 8 of SLC-96 RT 6. According to an embodiment of the invention, interface circuit 202 extracts PAM signals of the appropriate VF channels from backplane 8 for PAM to analog conversion, and also extracts a 1.544 MHz timing signal (RCLK) from backplane 8. Interface circuit 202 also provides the interface for multiple control signals between PLCD 206 and backplane 8. Since framing alignment signals are not separately available from backplane 8, interface circuit 202 provides the ability to convert PAM signals extracted from PAM buses in backplane 8 into full analog form for use by SICOFI 204.

The two converted analog signals from interface circuit 202 enter SICOFI 204 for analog-to-digital PCM 8-bit word conversion. SICOFI 204 multiplexes these two transmitted 8-bit PCM signals with 8 bits of control data and 8 bits of monitor channel data, and transmits these 8-bit PCM words over a serial input/output port (SIP) 257 to ICC 208. The signal between SICOFI 204 and ICC 208 is a 512 kbps ping-ponged two way signal. SICOFI 204 provides its own framing toward the DSL, provided that interface circuit 202 seizes the appropriate PAM signals for the two VF channels by interfacing with the PAM buses in backplane 8 in their designated time slots. Multiplexer 25 includes software that uses the time slot active signals available on backplane 8 to extract the appropriate PAM signals from backplane 8.

ICC 208 serves communication control and data handling functions. ICC 208 receives the 512 kbps ping-ponged SIP signal and converts it to a separate 256 kbps transmit signal sent to IECQ 212 via line 259a and a 256 kbps receive signal sent to from IECQ 212 via line 259b.

IECQ 212 converts the signal from ICC 208 to 160 kbps of user information (144 kbits of user data, plus 16 kbits of ISDN U-interface framing that contains embedded operations channel (EOC) M-bits, CRC, and error monitoring). IECQ 212 also converts the 160 kbps binary signal to an 80 kbps quaternary signal for transmission to RT 35 over twisted pair line 13. The 80 kbps 2B1Q signal containing 160 kbps of user information is transmitted via line 261a to line transformer 214 for transmission over twisted pair line 13.

Line transformer 214, providing 4-wire to 2-wire conversion, serves isolation and impedance matching functions. The DSL signal transmitted by multiplexer 25 enters RT 35 over a conventional twisted pair line 13, which may be the type commonly used in households, offices, or the like. The DSL signal from multiplexer 25 is an 80 kbps signal having one of four voltage levels (2B1Q). While the invention is illustrated herein with regard to the preferred 80 kbps signal, it is believed that the invention herein would find utility using signals of between about 50 and 100 kbps, and preferably between 70 and 90 kbps. Using other standards, such as 4B3T (a ternary signal), other rates may be desirable such as 120 kbps. The data rates and standards used herein are of course only illustrative and will of course vary from one system to the next and as the underlying technologies evolve.

Power supply circuit 216 converts −48 V voltage from the telephone company battery power from backplane 8 to supply the +5 V needed to supply power to multiplexer 25. In addition, power supply circuit 216 converts the −48 V to supply the −135 V and 0 V to power injection circuit 218. Power injection circuit 218 injects −135 V and 0 V from power supply circuit 216 into the DSL signal to line power RT 35 at the subscriber premises, without use of a battery or other power source at the site of RT 35. An advantage of the use of −135 V and 0 V to line power RT 35 is that less corrosion occurs at RT 35. Of course, other embodiments of the invention may power RT 35 at its remote site using AC wall unit supplied power or the like.

In general, PLCD 206 provides random access memory (RAM), read only memory (ROM), and input/output (I/O) port integration functions usually handled by microprocessor bus expansion chips like buffers, latches and multiplexers. PLCD 206 includes an internal field programmable gate array (FPGA) area that is used to implement various timing as well as backplane interface functions. As this internal FPGA area is not readable after PLCD 206 has been programmed, advantages of the system include, for example, security for both software and functional design.

PLCD 206 is coupled to interface circuit 202, microprocessor 210, and ICC 208. PLCD 206 receives multiple input signals from backplane 8 and outputs multiple control signals, via interface circuit 202 coupled to backplane 8. In particular, PLCD 206 asserts various timing signals to interface circuit 202 in order to control access to the PAM buses in backplane 8, such as enabling transmission or reception of signals to and from backplane 8. PLCD 206 also asserts control signals to backplane 8 to determine when a channel slot is active. The FPGA part of PLCD 206 helps decode which channel slot is occupied by multiplexer 25 and thus determine when that channel is active on the PAM buses.

For incoming signals, PLCD 206 controls access to the RPAM bus so that interface circuit 202 outputs the appropriate analog signals for input to SICOFI 204. PLCD 206 makes use of the output of SICOFI 204 to build each 64 kbps DS0 and multiplex the two DS0 signals (B1 and B2) into the 512 kbps signal over SIP 257.

The functionality of multiplexer 25 is overseen by microprocessor 210. Microprocessor 210 receives a frame control signal (FSC) at, for example, about 8 kHz. SICOFI 204, ICC 208, and IECQ 212 also operate on the FSC signal and on a clock signal (CLK) at, for example, about 512 kHz, provided over line 273. Microprocessor 210 is coupled to PLCD 206 and ICC 208 over a data bus line 263 and an address bus line 263. Microprocessor 210 is also coupled to PLCD 206 via direct control leads 267.

In other embodiments, the functionality of PLCD 206, for example, may be replaced with a ROM, with a custom integrated chip, its functionality may be performed in the microprocessor, or the like. Conversely, most or all of the functionality of the microprocessor may be performed in PLCD 206.

In another alternate embodiment, multiplexer 25 extracts PCM based signals available from backplane 8. This embodiment of multiplexer 25 replaces the PAM decoders and SICOFI 204 and instead includes a framer/multiplexer chip design to recreate the frame alignment by which the PCM samples per VF channel can be accessed from backplane 8 for use by ICC 208 and IECQ 212. A framer is designed for aligning the various VF channels and selecting the appropriate two VF channels corresponding to the shelf location of the plug-in. According to this embodiment, PLCD 206 performs buffer, time slot stuffing, DS0 building, and multiplexing functions.

As will be apparent to one of ordinary skill in the art, outgoing signals from the subscriber are processed in a similar but reverse method from incoming signals.

Figure 4A:
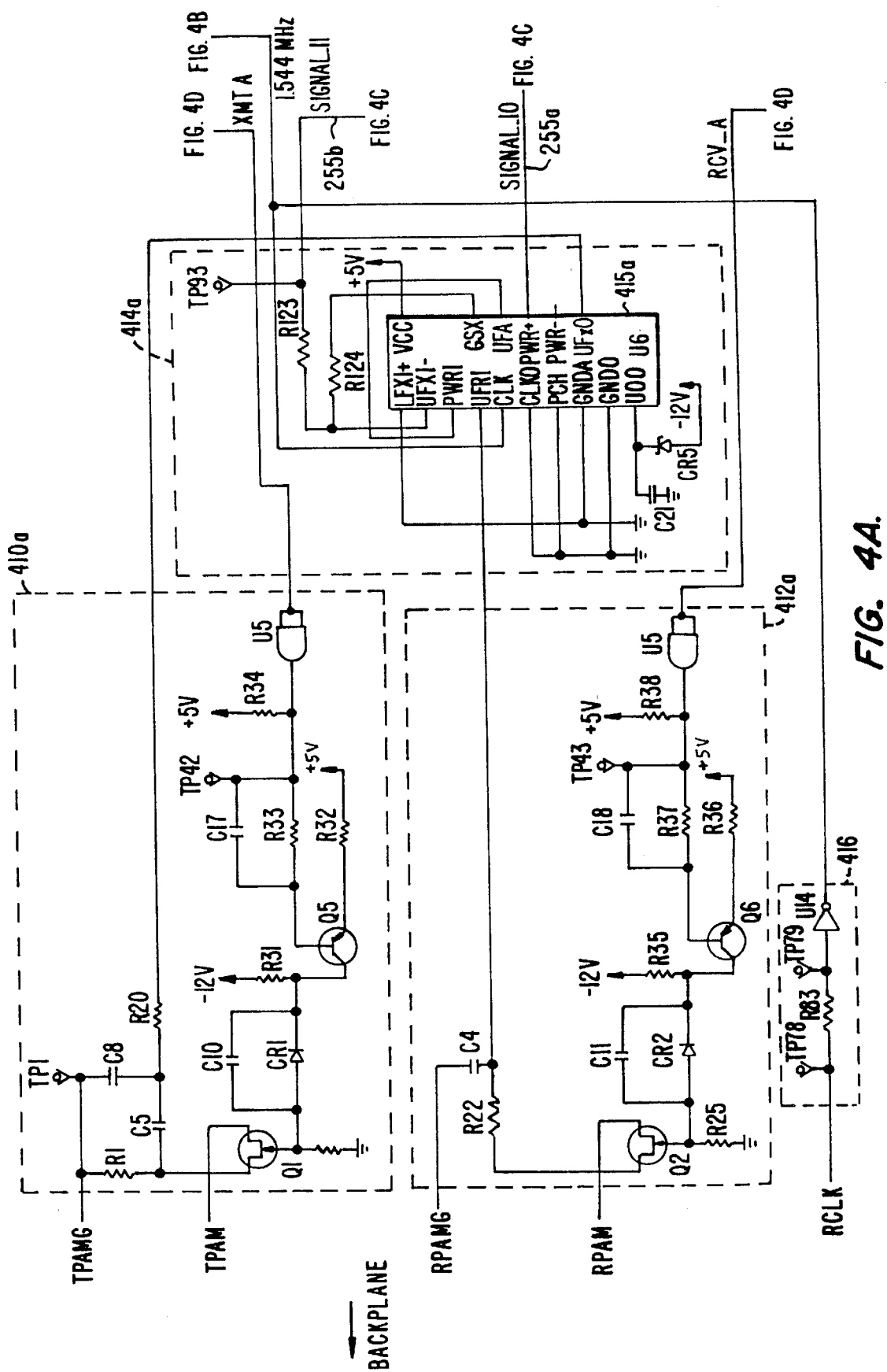
FIGS. 4a–4h are detailed schematic diagrams of SLC-96 plug-in multiplexer 25 according to an embodiment of the invention.
Figure 4B:
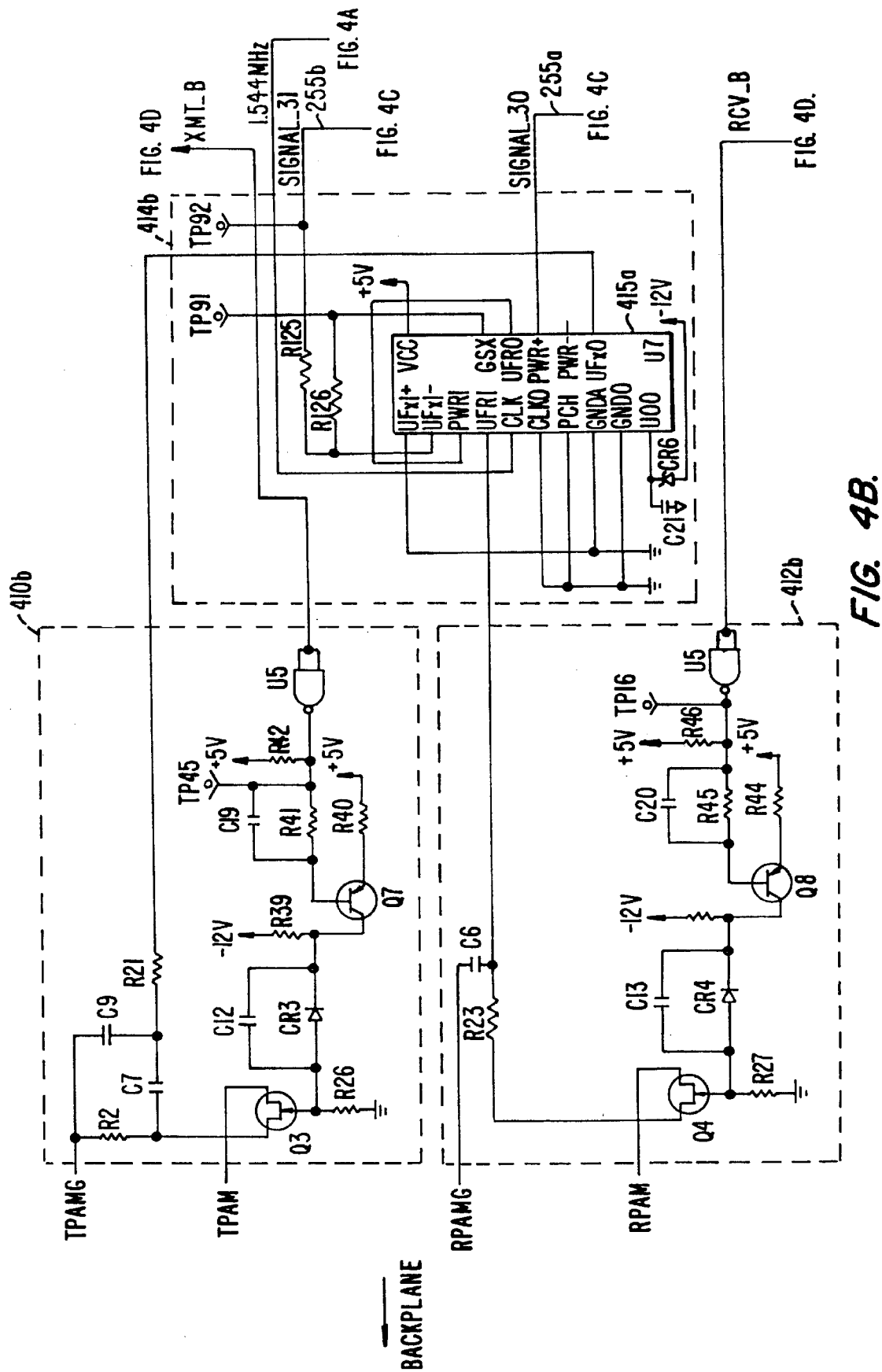

FIGS. 4a–4h provide detailed schematic diagrams of multiplexer 25 according to an embodiment of the invention. In particular, FIGS. 4a–b provide detailed schematic diagrams of portions of interface circuit 202. In FIGS. 4a and 4b, interface circuit 202 includes TPAM bus access circuits 410a and 410b, RPAM bus access circuits 412a and 412b, PAM codec circuits 414a and 414b which include PAM codec chips 415a and 415b, and RCLK interface circuit 416. As seen in FIGS. 4a–4b, the 1.544 MHz timing signal RCLK from backplane 8 is input via RCLK interface circuit 416 for use by PAM codec circuits 414a and 414b. Control signals XMT_A and XMT_B from PLCD 206 control TPAM bus access circuits 410a and 410b, respectively, to transmit the digitized signals (converted by PAM codec circuits 414a and 414b from analog SIGNAL_11 and SIGNAL_31 input via lines 255b from SICOFI 204) to the TPAM bus in backplane 8. Control signals RCV_A and RCV_B from PLCD 206 control RPAM bus access circuits 412a and 412b, respectively, to receive the digitized PAM signals (for conversion by PAM codec circuits 414a and 414b into analog SIGNAL_10 and SIGNAL_30 for input to SICOFI 204 over lines 255a) from the RPAM bus in backplane 8. Other portions of interface circuit 202 include circuit blocks 420 and 422 of FIG. 4d, which serve as interface circuitry between PLCD 206 and backplane 8.

Figure 4C:
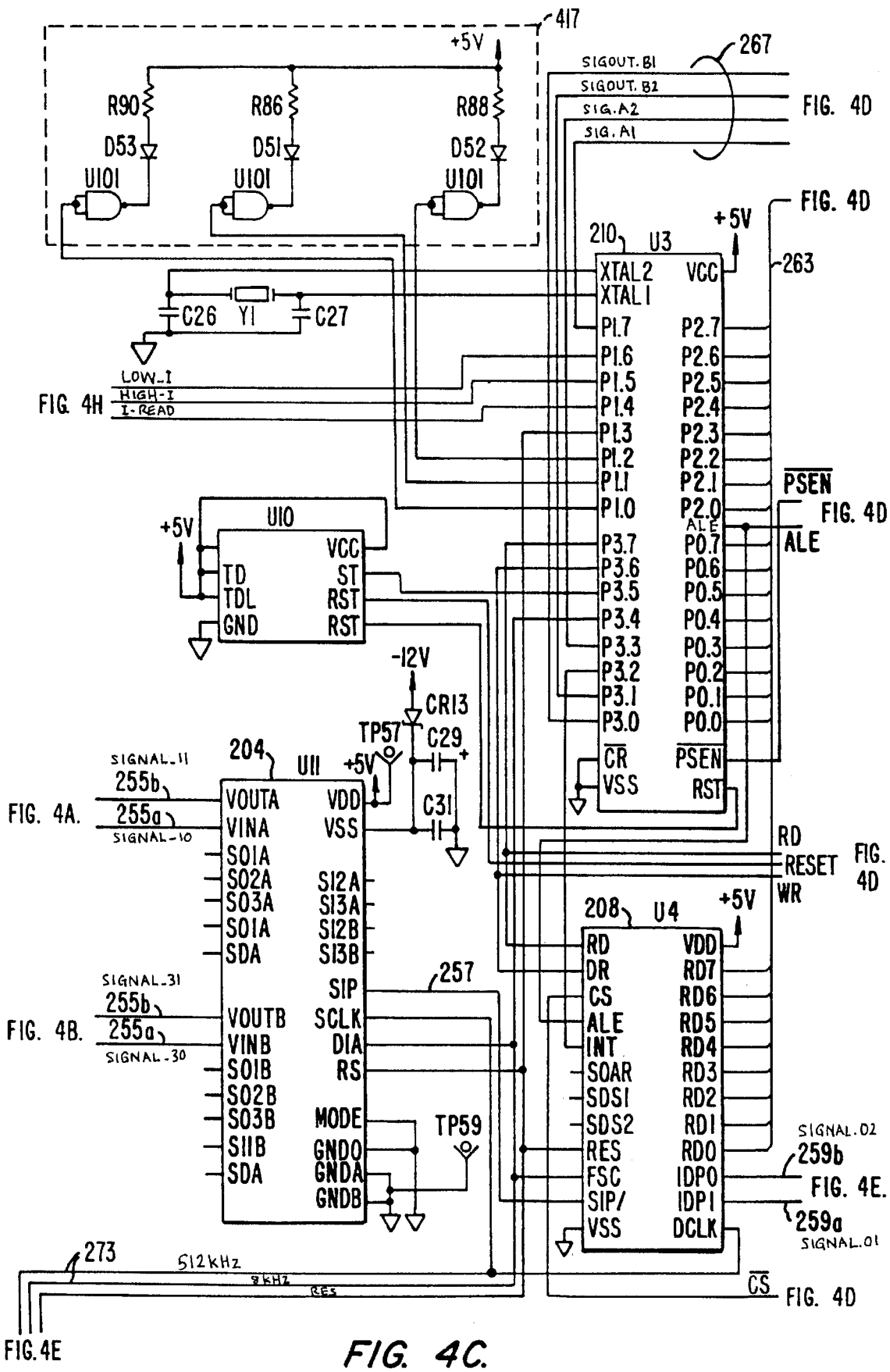

As seen in FIG. 4c, multiplexer 25 includes SICOFI 204, microprocessor 210, ICC 208, and faceplate LED indicator circuit 417. SICOFI 204 transmits 8-bit binary words corresponding to SIGNAL_10 and SIGNAL_30 and receives 8-bit binary words corresponding to SIGNAL_11 and SIGNAL_31 over SIP 257 connected to ICC 208. ICC 208 converts data from SIP 257 into separate 256 kbps transmit and receive signals SIGNAL.02 and SIGNAL.01 over lines 259b and 259a respectively. IECQ 212 (in FIG. 4e) receives and converts signals on lines 259b and 259a to 160 kbps of user information and also converts the 160 kbps signal into an 80 kbps 2B1Q signal for transmission to line transformer 214 over line 261a.

As illustrated in FIG. 4c, faceplate LED indicator circuit 317, coupled to microprocessor 210, includes three LEDs. A red LED indicating a "busy" VF channel active, is to guide repair operations to not remove multiplexer 25 until both channels served are indeed idle, thereby ensuring that phone service is not disrupted. A green LED is to indicate an active or "linked" DSL. Additionally, a yellow LED indicates a "MINOR" alarm state, usually displayed when a link is lost between multiplexer 25 and RT 35.

Figure 4D:
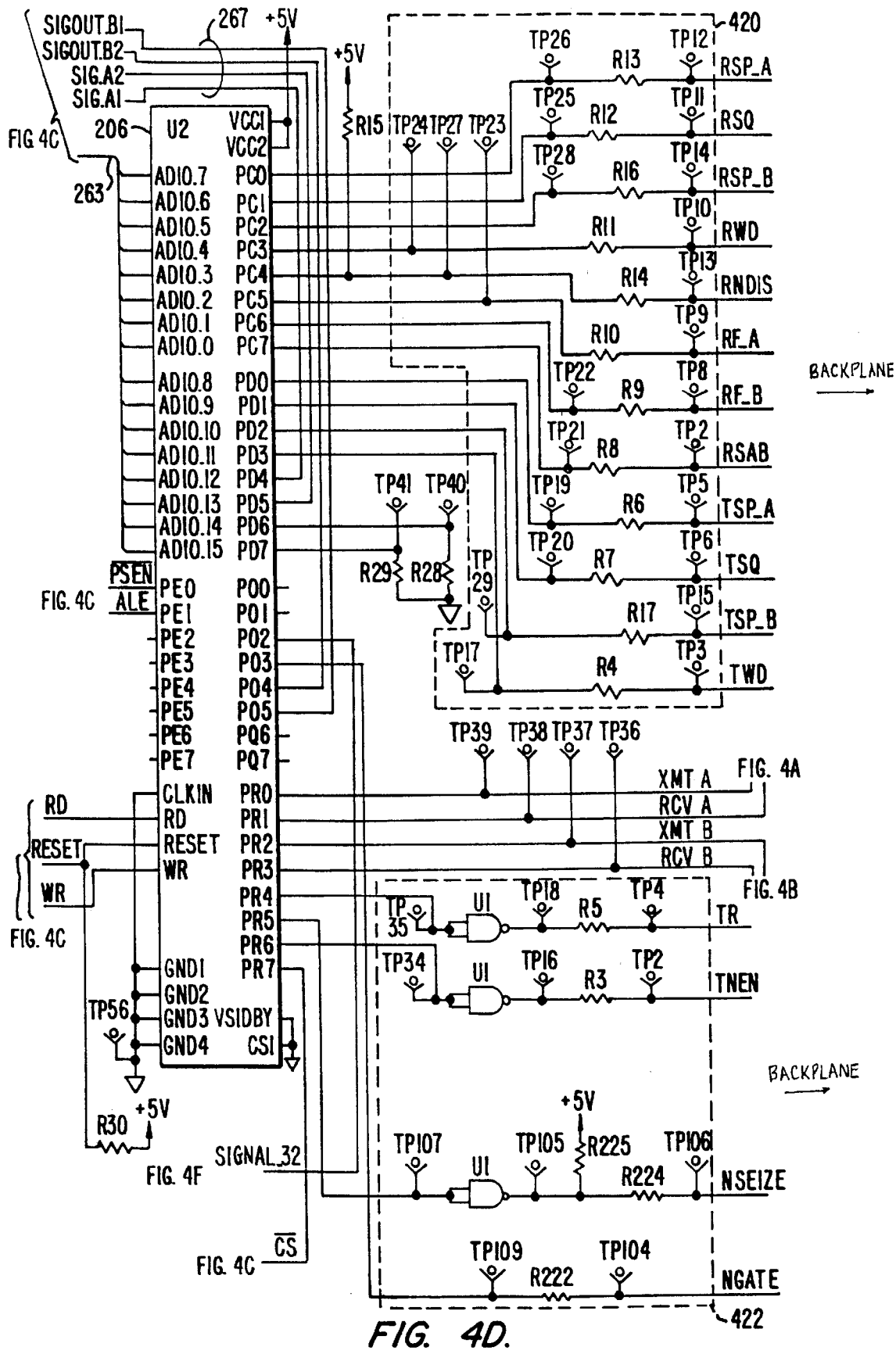

As seen from FIGS. 4c–d, microprocessor 210, ICC 208, and PLCD 206 are coupled via data bus 263. Microprocessor 210 is coupled to PLCD 206 via address bus 263, and via direct control leads 267. Microprocessor 120 includes, inter alia, software functionality to provide a power saver feature such that when no activity is detected in the two B-channels, certain elements within the chips can be idled for power savings. Microprocessor 210 uses control signals SIGOUT.B1, SIGOUT.B2, SIG.A1, and SIG.A2 on direct control leads 267 to control PLCD 206 in asserting XMT_A, RCV_A, XMT_B, and RCV_B signals to access backplane 8 and to act based on various signals from backplane 8 decoded by PLCD 206.

Portions 410a, 410b, 412a, and 412b (as seen in FIGS. 4a–4b) of interface circuit 202 have access to PAM signals, TPAM, TPAMG (TPAM Ground), RPAM, and RPAMG (RPAM Ground) from backplane 8. Other portions 420 and 422 (FIG. 4d) of interface circuit 202 provide access to signals RSP_A, RSQ, RSP_B, RWD, RNDIS, RF_A, RF_B, RSAB, TSP_A, TSQ, TSP_B, TWD, NSEIZE, and NGATE from backplane 8 for PLCD 206 to determine the state of buses in backplane 8 or to control which channel is seized, etc. For example, the moment when the condition where TSP_B, TSQ and TWD are high at the same time, indicates a unique transmit time slot for a particular even-numbered channel unit on a physical slot (or shelf position). TSP_A, which may be for odd-numbered channels, is the same as TSP_B except for a time shift with respect to TSP_B. NSEIZE and NGATE are control signals put on backplane 8 to indicate when a channel unit desires to transmit a signal onto the TPAM bus. Interface circuit 202 also provides interface between signals TR and TNEN and backplane 8. TR and TNEN control PAM signals into backplane 8.

Figure 4E:
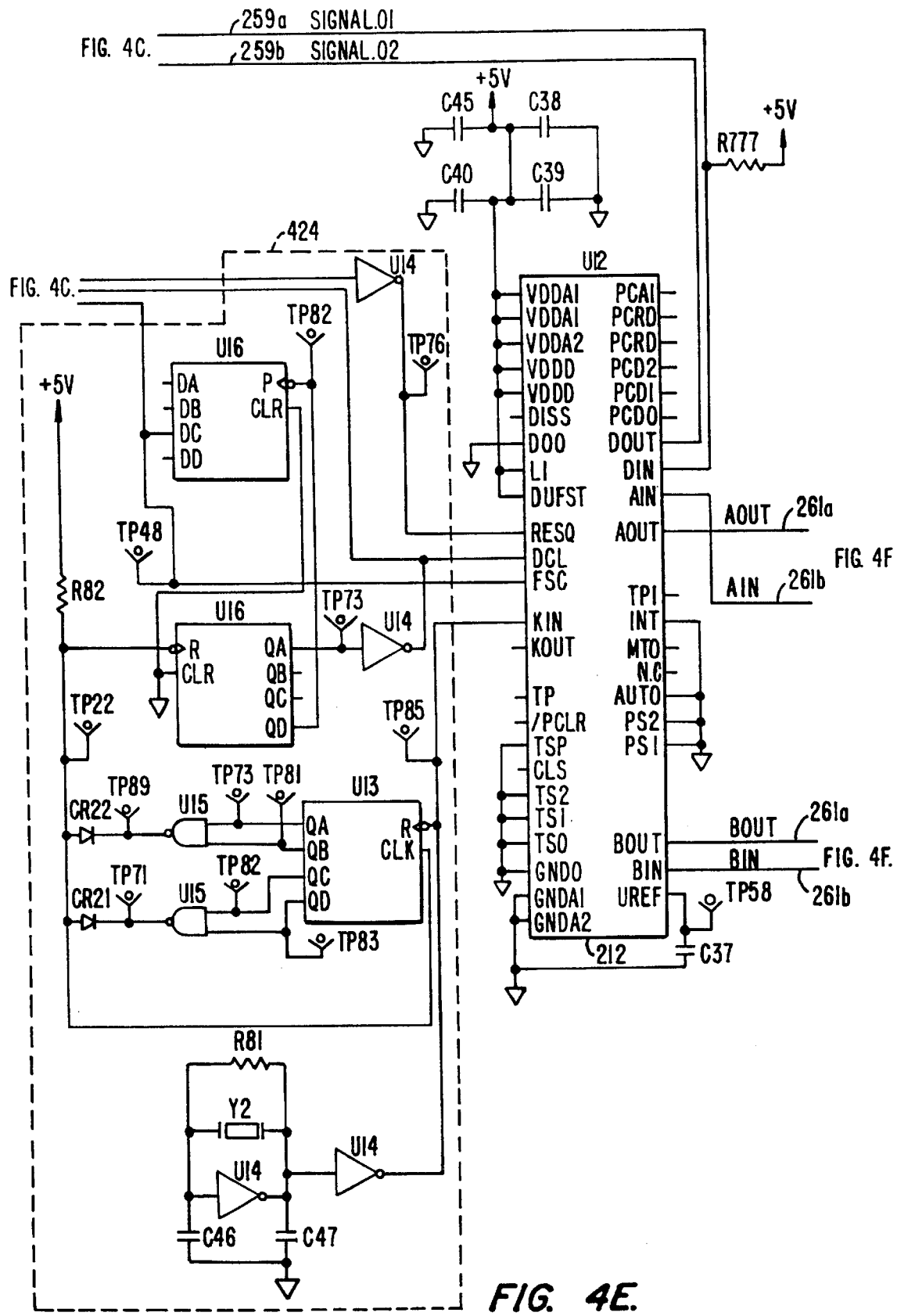

FIG. 4e illustrates IECQ 212 and clocking circuitry 424 which provides timing to IECQ 212, and to ICC 208 and SICOFI 204. IECQ 212 receives SIGNAL.01 and SIGNAL.02 for conversion to an 80 kbps 2B1Q signal in 4-wire format.

Figure 4F:
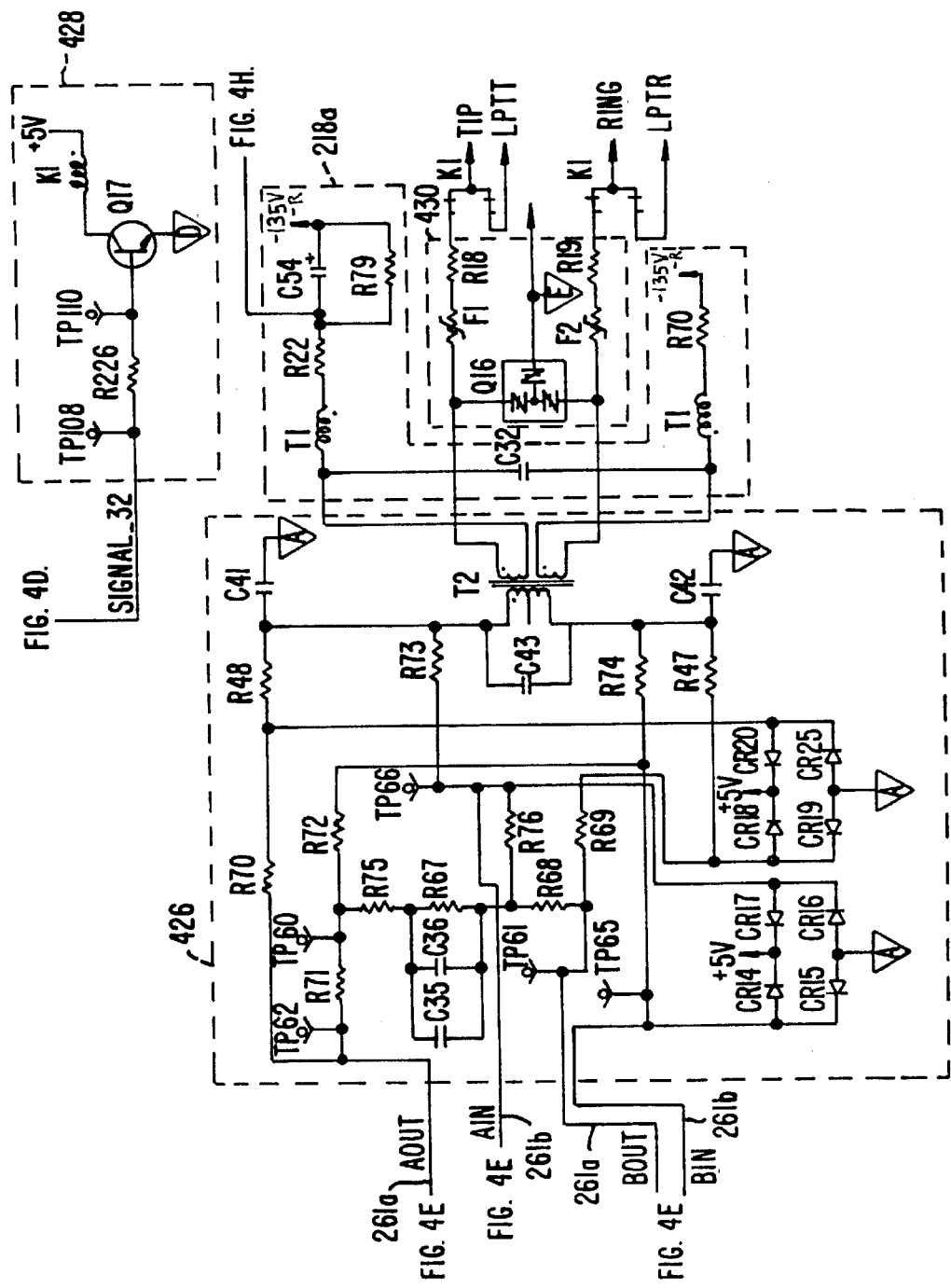

As illustrated in FIG. 4f, the system of multiplexer 25 and RT 35 is testable via an access relay circuit 428 to test bus terminals, LPTT (Loop Test Tip) and LPTR (Loop Test Ring) in backplane 8. A SIGNAL.32 asserted by PLCD 206 enables access relay circuit 428 to enable testing of multiplexer 25/RT 35 system through a Pair Gain Test Controller (PGTC) of the conventional SLC-96 system. Therefore, if a link is lost, the DSL pair is switched to the LPTT and LPTR terminals on backplane 8 where PGTC/MLT can test it directly to determine whether the cause of a failure is a bad multiplexer 25 or a bad RT 35. A bad DSL will likely result in a loss of link.

Figure 4G:
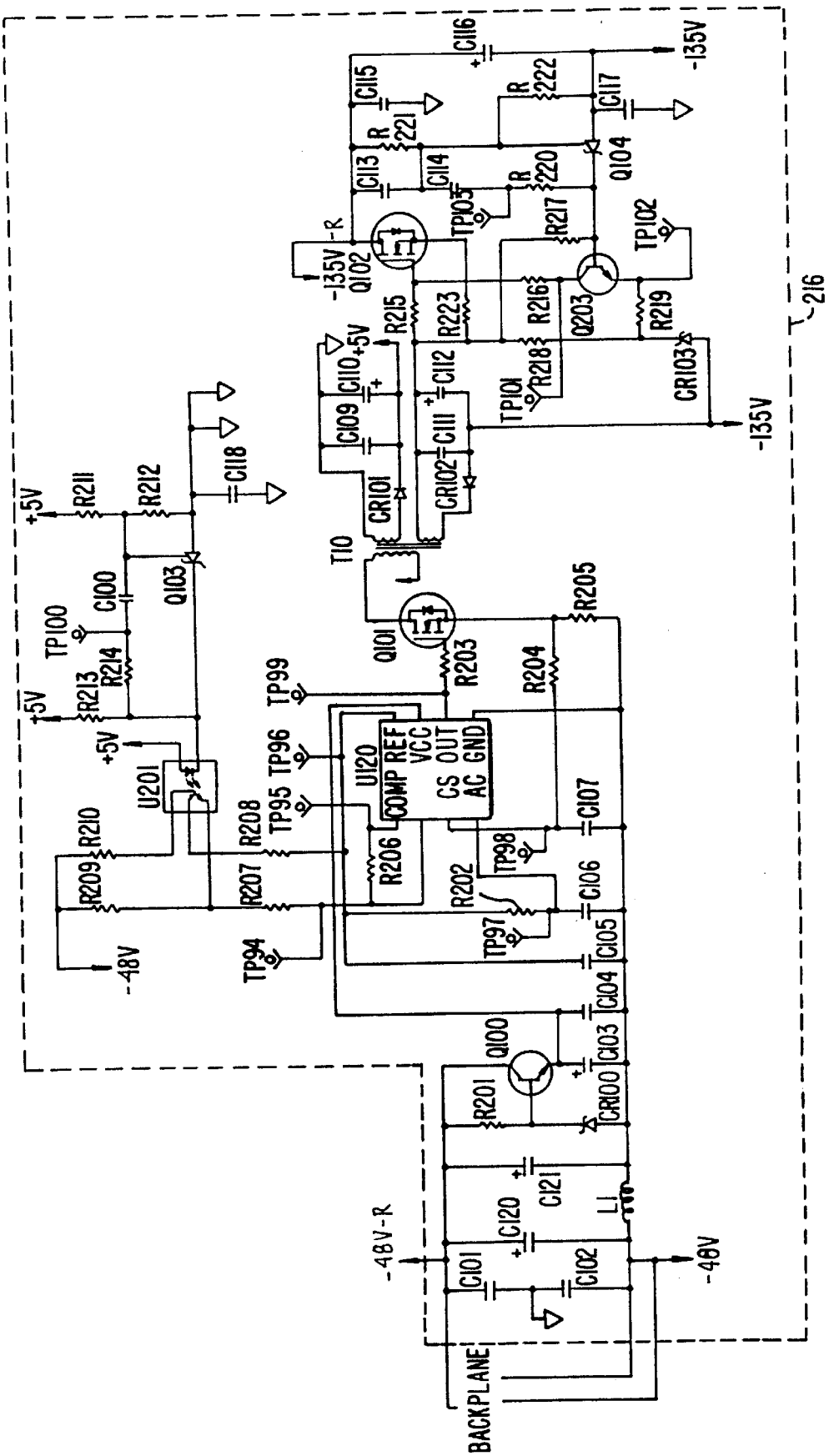
Figure 4H:
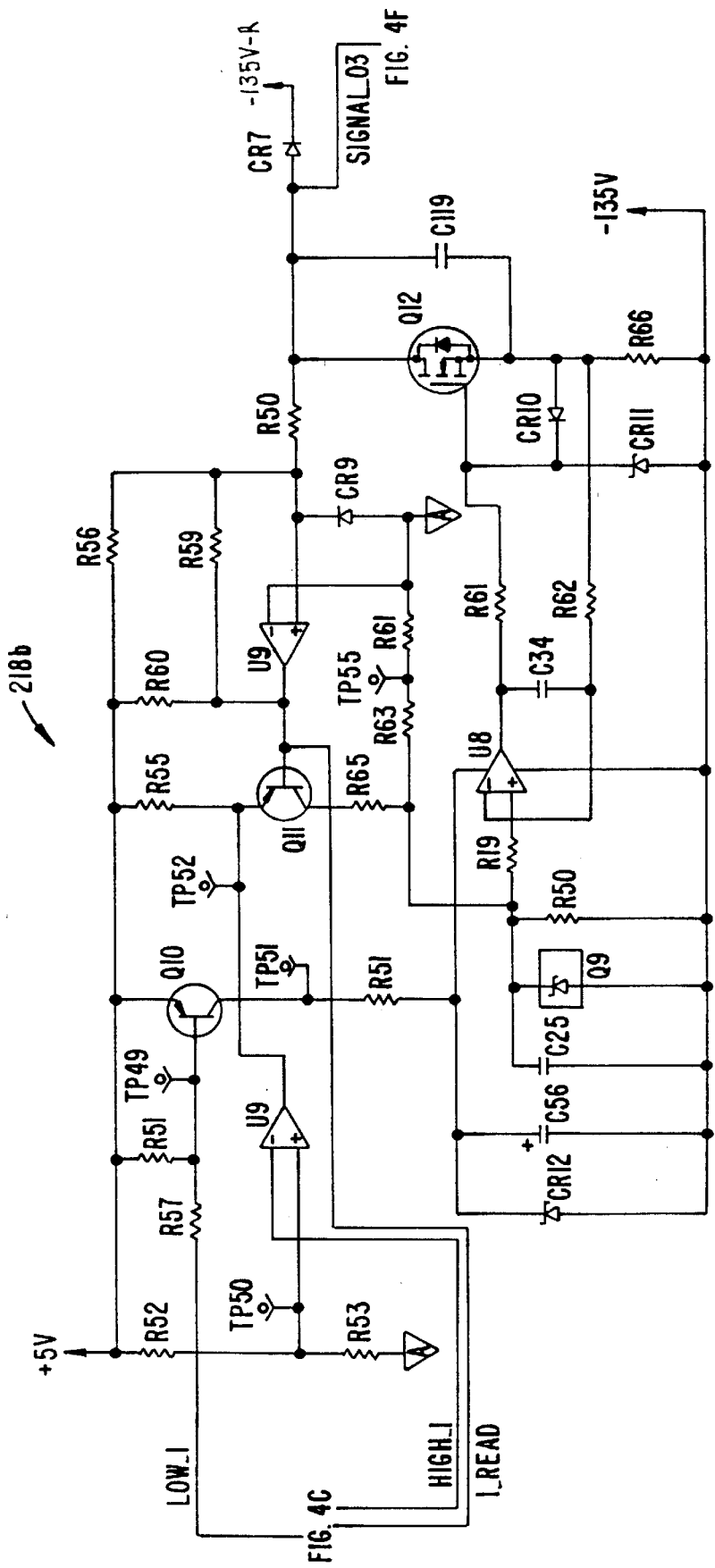

FIG. 4f also illustrates power cross and lightning protection circuit 430, and a portion 218a of power injection circuit 218. The remaining portion 218b of power injection circuit 218 is illustrated in FIG. 4h. As seen in FIG. 4h, control signals LOW_I, HIGH_I, and I_READ from microprocessor 210 control whether −135 V is injected into the DSL signal. FIG. 4g illustrates power supply circuit 216 which provides the +5 V used to power multiplexer 25, as well as the −135 V used by power injection circuit 218 to line power RT 35 via the DSL signal transmitted over twisted pair line 301.

Appendix 1 provides complete schematic representations (© Copyright, Unpublished Work, Raychem Corporation) of SLC-96 Plug-In Multiplexer 25 discussed above. However, certain modifications or alterations to the schematics may be made by one of ordinary skill in the art, yet still remain within the scope of the invention.

B. Remote Terminal Hardware

Figure 5:
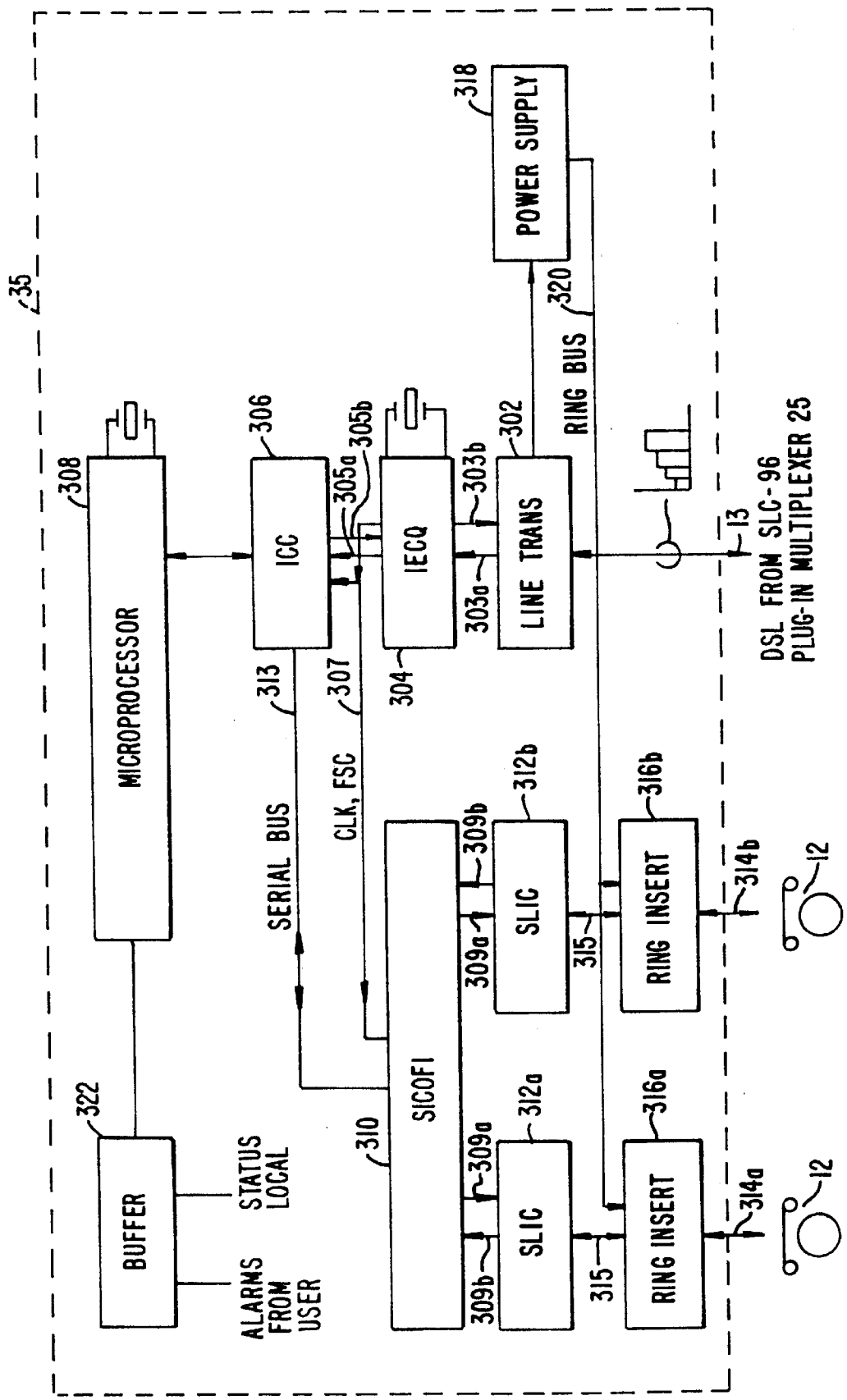
FIG. 5 is a general block diagram of Remote Terminal (RT) 35 for use with SLC-96 plug-in multiplexer 25.

FIG. 5 provides a general block diagram of RT 35 according to an embodiment of the invention. Subscriber equipment $12_1$ and $12_2$ utilize analog signals produced by RT 35 and provide analog signals to RT 35 for transmission over twisted pair lines.

The DSL signal transmitted from multiplexer 25 over a twisted pair line 13 enters a line transformer 302 for isolation and for impedance matching. The DSL signal entering line transformer 302 is an 80 kbps signal.

The signal from line transformer 302 enters an ISDN Echo Cancellation-Quaternary (IECQ) chip 304 via line 303a. The 80 kbps 2B1Q signal contains 160 kbps of information and IECQ chip 304 converts the 80 kbps signal into a 160 kbps binary signal. The 160 kbits includes 16 kbits of line control information and 144 kbits of user data. 112 kbps of chip control information are added to the data stream by IECQ chip 304, resulting in 256 kbps data stream from IECQ chip 304 and provided to an ISDN Communications Controller (ICC) chip 306 over line 305a. ICC 306 operates on a clock signal (CLK) at, for example, about 512 kHz and a frame control signal (FSC) at, for example, about 8 kHz. CLK and FSC are provided over line 307.

Over a one-wire serial bus 313, ICC chip 306 sends 8 bits of data on one channel, 8 bits of data on the other channel, 8 bits of control, and 8 bits of signal data to a dual channel signaling codec filter (SICOFI) 310, and then repeats, permitting substantially simultaneous transmission/reception of two or more voice or data signals. Monitor data, ring data, and other data which a microprocessor 308 polls are also made available to microprocessor 308.

SICOFI 310 converts the binary bits into analog signals in which both frequency and amplitude are modulated. The analog signals are then transmitted over line 309a to Subscriber Line Interface Circuits (SLIC's) 312a and 312b. SLIC's 312a and 312b are 4-wire to 2-wire converters and serve to increase the power available for utilization by the subscriber's phone or other communication device by enpressing the analog signal on high velocity DC. Conventional analog information is provided to subscriber equipment $12_1$ and $12_2$ from SLIC's 312a and 312b over lines 314a and 314b.

Ring inserts 316a and 316b are relays which close when it is desired for a phone to ring under the direction of microprocessor 308. Power supply 318 provides general power and ring power to the phones at appropriate times via a ring bus 320. Buffer 322 serves to interface local status and alarms.

Outgoing signals from the subscriber are processed in a similar but reverse method from incoming signals. In particular, analog signals enter SLIC's 312a and 312b for two-wire to four-wire conversion via lines 315. Signals from SLIC's 312a and 312b enter SICOFI 310 via lines 309b for analog-to-binary 8-bit word conversion. These 8-bit words are, thereafter, converted in SICOFI 310 to the 512 kbps ping-ponged two way signal on SIP 257 sent to ICC 306. ICC 306 sends it at 256 kbps to IECQ 304 via lines 305a and 305b. IECQ 304 converts it to a binary stream containing 160 kbps of user information (144 kbits of user data plus 16 kbits of line control). IECQ 304 also converts the 160 kbps signal to an 80 kbps quaternary signal for transmission via line transformer 302 to multiplexer 25 over the twisted pair 301.

RT 35 has been described in further detail in PCT International Publication Number WO 91/01600 and U.S. Pat. No. 5,111,497, which have been completely incorporated by reference for all purposes.

C. Remote Terminal Enclosures

In situations where the telephone company desires to provide or extend service to a customer location which experiences a lack of existing twisted pair lines, the installation of multiplexer 25 at SLC-96 RT 6 also requires the installation of RT 35 at the customer location. It is also desirable to have simple procedures in the installation of RT 35, to reduce costs on labor as well as to provide quick installation of service to the customer. Additionally, ease and speed of installation of RT 35 is desirable to cut down on labor costs.

Figure 6:
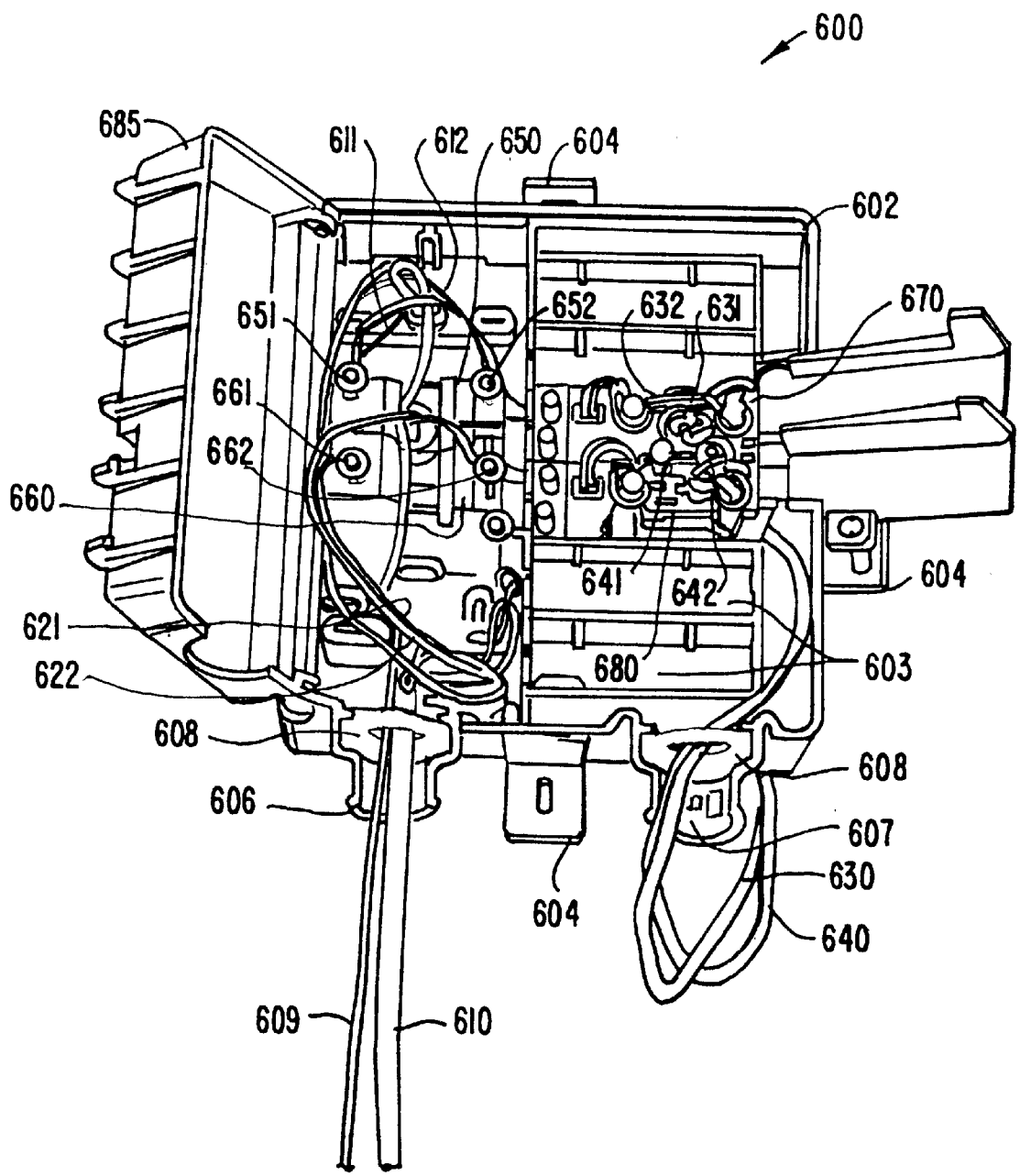
FIG. 6 illustrates an opened-up network interface device (NID)
Figure 7:
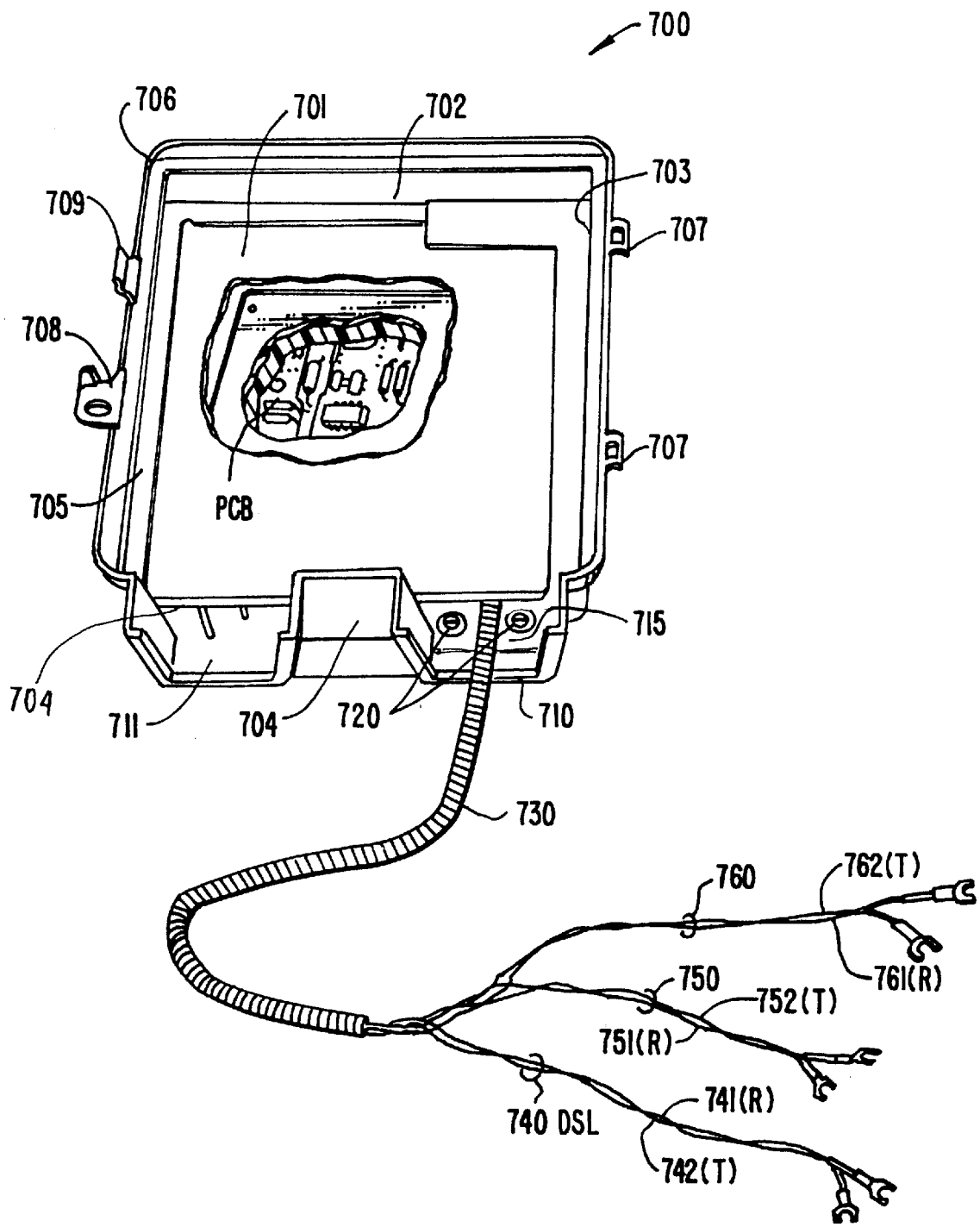
FIG. 7 illustrates an underside view of a RT enclosure according to an embodiment of the invention.
Figure 8:
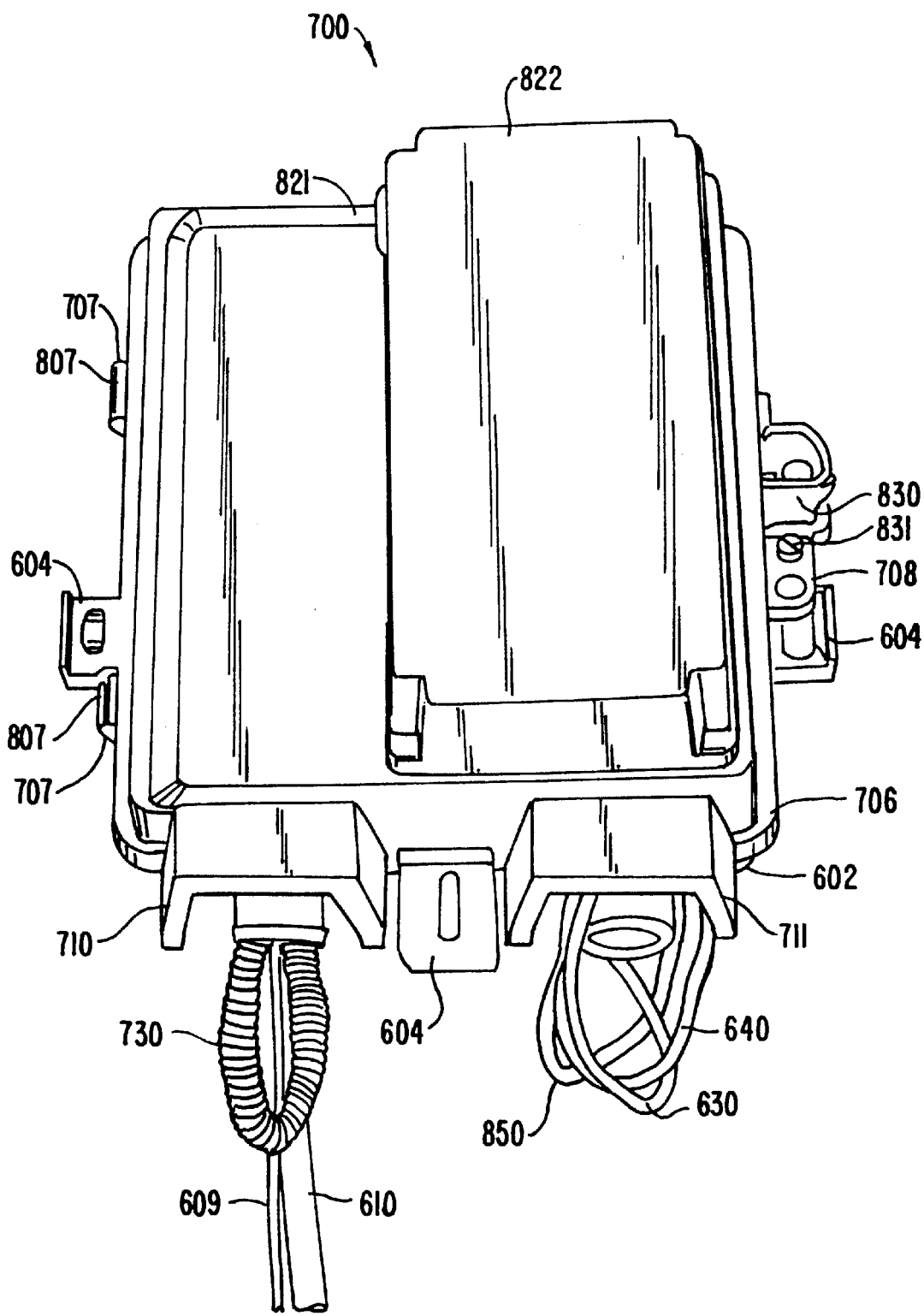
FIG. 8 illustrates a top view of a RT enclosure installed onto a conventional NID.

The electronics of RT 35, such as that illustrated in FIG. 5, will often have to be located in an unprotected environment at a subscriber location. Access to various portions of RT 35 is desirably limited. Often, the user location has at least one pre-existing twisted pair leading to the subscriber wiring. In accordance with another embodiment of the invention, an RT enclosure is provided which reduces the installation time required to install RT 35 at a subscriber location. FIG. 6 illustrates an opened-up network interface device (NID). FIG. 7 illustrates an underside view of a RT enclosure according to an embodiment of the invention, and FIG. 8 illustrates a top view of a RT enclosure installed onto a conventional NID.

It is desirable for the RT electronics to be located near an existing Network Interface Device (NID) mounted near or installed at a subscriber location. A NID typically includes a NID base, a NID mounting plate or the like, subscriber wiring, telephone company wiring, subscriber and telephone company wire interfacing connections, and a cover. FIG. 6 illustrates an example of a conventional NID 600 (without its cover).

In FIG. 6, NID 600, merely by way of example, contains wiring connections for two subscriber lines. FIG. 6 illustrates NID 600, shown without its cover, to reveal a NID base 602, mounting supports 604 built under base 602, multiple subscriber wiring sled stalls 603 in base 602, telephone company line access port 606, subscriber line access port 607, grommets 608, wire 611, telephone company wrapped line 610 containing wires 611, 612, 621, and 622, subscriber A line 630 including wires 631 and 632, subscriber B line 640 including wires 641 and 642, single pair station protector 650 with terminal blocks 651 and 652, single pair station protector 660 with terminal blocks 661 and 662, subscriber A wiring sled 670, subscriber B wiring sled 680, and inner door 685.

As shown in FIG. 6, wires 631 and 632 of subscriber A line 630 respectively connect via subscriber A wiring sled 670 to terminal blocks 651 and 652, which are connected respectively to wires 611 and 612 of telephone company wrapped line 610. Therefore, subscriber A is connected for telephone service. Wires 641 and 642 of subscriber B line 640 respectively connect via subscriber B wiring sled 680 to terminal blocks 661 and 662, which are connected respectively to wires 621 and 622 of telephone company wrapped line 610. Therefore, subscriber B is also connected for telephone service.

FIG. 7 is a bottom view of an RT electronics housing enclosure, called door enclosure 700, in accordance with an embodiment of the invention. As seen in the cut-out view in FIG. 7, door enclosure 700, constructed to resemble a door to a conventional NID, actually contains the RT electronics on a printed circuit board (PCB) within the structure of the door.

As seen in FIG. 7, door enclosure includes a bottom surface 701 extending out to sides 702, 703, 704, and 705. Sides 702, 703, and 705 are adjoined by an edge trim 706. Side 703 includes hinge mounts 707 for connecting to a conventional NID. Side 705 includes a fastener mount 708 and a clasp 709, so that door enclosure 700 can be secured to a NID, ensuring a closed door. Side 704 includes access port covers 710 and 711 for covering telephone line or subscriber line access ports. Either access port cover includes space for an RT electronics interface 715, which may be secured by fasteners 720. Interface 715 may be any connector which contains the necessary wiring for the RT electronics. Fasteners 720, for example, may be any type of fastening device such as screws with washers, as long as the fasteners do not damage or interfere with the wiring or electronics. Interface 715 includes wiring protection 730, such as wire tubing, tape or the like, which houses the necessary wiring from the RT electronics interface 720. Fanned out from wire protection 730 are a pair 740 (DSL) of wires 741 (R) and 742 (T), a pair 750 of wires 751 (R) and 752 (T), and a pair 760 of wires 761 (R) and 762 (T). These wires (identified accordingly by color, for example) are connected appropriately to RT electronics within door enclosure 700.

In accordance with an embodiment of the invention, RT 35 may be used with a conventional NID to provide another subscriber C with telephone service where, for example, there are only two twisted pairs in that location, which are currently used for subscribers A and B. By plugging in multiplexer 25 to SLC-96 RT 6, for example, and by installing the electronics of RT 35 at or near the subscriber location, an existing twisted pair may be used to provide an additional line of telephone service. Thereby, three subscribers A, B, as well as C, are provided service, as seen in FIG. 8.

With door enclosure 700, installation is simplified. Since pair 740 is set up as a DSL, pairs 750 and 760 are used to connect to subscribers A and B. Accordingly, one twisted pair from plugged-in multiplexer 25, for example, wires 611 and 612 in FIG. 6, is set up as a DSL to provide service for two telephone lines. Wires 631 and 632 of subscriber A line would be disconnected from terminal blocks 651 and 652. Wires 751 and 752 of DSL pair 750 would respectively be connected to terminal blocks 651 and 652, providing electrical connection respectively to wires 611 and 612. This electrical connection would establish the DSL between RT 35 and multiplexer 25. Wires 631 and 632 of subscriber A line could be connected respectively to wires 761 and 762 of pair 750, thereby providing telephone service for subscriber A through the multiplexer 25/RT 35 system. Subscriber B line can remain connected via the other pair of wires 621 and 622 for telephone line service. To provide subscriber C with telephone line service, wires 761 and 762 of pair 760 would be connected respectively to a new wiring sled, which would then be placed into one of the remaining wiring sled stalls 603 in base 602.

After installation of the wiring, the lids of all wiring sleds, and any inner door 685 or the like, if any exists, in NID 600 would be closed. As seen in FIG. 8, a top view of door enclosure 700 installed with a conventional NID, door enclosure 700 via hinge mounts 707 could be connected to existing hinges 807 of NID 600. Door enclosure 700 accordingly is used not only as a door for NID 600 but also to provide additional telephone line service at a 2:1 pair gain savings, depending inter alia on the RT electronics housed therein. Door enclosure 700 a top surface including surface 821 and surface 822, which is at a different height level from surface 821. In this embodiment, this difference in dimensions is due to the space needed by the RT electronics housed within the inner regions of door enclosure 700. As seen in FIG. 8, NID base 602 also includes a fastener mount 830. Fastener mount 830 along with appropriate fastener may be used in concert with fastener mount 708 of door enclosure 700. Door enclosure 700 includes fastener mount 708 for an appropriate fastener 831 to fasten down door enclosure 700 to NID base 602. Of course, surfaces 821 and 822 may be any variety of shapes or at various levels, depending on design, ergonomics, electronics, etc. Additionally, bottom surface 701 may be relatively flat or otherwise, so as to accomodate the dimensions of any inner doors or other devices that may take up space within NID. The location of RT electronics within the inner regions of door enclosure 700 may be altered for space considerations or the like.

Door enclosure 700 may be used with an existing NID without a cover/door, or may be used with its own NID. Similarly, enclosure 700 may itself be mounted (by merely adding mounting mechanisms, for example) at a close enough distance to an existing NID to be wired into it.

Of course, other electronics may be placed in door enclosure 700 by changing PCBs, and other associated changes to the wiring, interface 715, and other aspects of the enclosure, as required. Door enclosure 700 allows great flexibility in installation of the RT electronics or the like, as it allows telephone company personnel to simply make a few wiring changes and merely snap on door enclosure 700. Additionally, the electronics as well as connectors in door enclosure 700 may be environmentally sealed with gels or the like. Use of door enclosure 700 also allows easy upgrading or changing of services provided over telephone lines.

Without in any way limiting the scope of the invention, Tables 1 and 2 provide a list of commercially available components which are useful in operation of the multiplexer 25 and RT 35, respectively, according to the above embodiments. It will be apparent to those of skill in the art that the components listed in Table 1 and Table 2 are merely representative of those which may be used in association with the inventions herein and are provided for the purpose of facilitating assembly of a device in accord with the invention. A wide variety of components readily known to those of skill in the art could readily be substituted or functionality could be combined or separated. It should be noted that CMOS-based devices have been utilized where possible (e.g., the microprocessor) so as to reduce power consumption of SLC-96 Plug-in Multiplexer 25 and RT 35 in particular.

TABLE 1

| SLC-96 Plug-in Multiplexer Components | |
| --- | --- |
| SICOFI 204 | Siemens 2260 OR 2060 |
| ICC 208 | Siemens 2070 |
| IECQ 212 | Siemens 2091 |
| PLCD 206 | Wafer Scale Integration (WSI) PSD411A2 |
| Microprocessor 210 | Intel 80C31, 80C51, 87C51 |

TABLE 2

| Remote Terminal Components | |
| --- | --- |
| SICOFI 310 | Siemens 2260 or 2060 |
| ICC 306 | Siemens 2070 |
| IECQ 304 | Siemens 2091 |
| Microprocessor 308 | Intel 80C31, 80C51, 87C51 |
| SLIC 312 | Ericsson 3764A4 |

III. Software/Microprocessor Functionality

Appendix 2 (© Copyright, Unpublished Work, Raychem Corporation) provides software for programming the PLCD 206.

Appendix 3 (© Copyright, Unpublished Work, Raychem Corporation) provides the software for operation of the microprocessor 210 according to an embodiment of the invention.

IV. Conclusion

It is to be understood that the above description is intended to be illustrative and not restrictive. Many embodiments will be apparent to those of skill in the art upon reviewing the above description. By way of example the inventions herein have been illustrated primarily with regard to transmission of voice and data signals (POTS) in SLC-96 systems, but they are not so limited. For example, the inventions could be applied in the transmission and reception of radio and TV signals, telephoto, teletype, facsimile, and other signals. By way of further example, the inventions have been illustrated above with reference to the simultaneous transmission of two signals over a single twisted pair, but the inventions could readily be extended to transmit 3 or more signals simultaneously over a single twisted pair. The scope of the inventions should, therefore, be determined not with reference to the above description, but should instead be determined with reference to the appended claims, along with the full scope of equivalents to which such claims are entitled.

What is claimed is:

1. A telephony system for transmitting signals to and from a subscriber line comprising:

a subscriber line carrier unit comprising a backplane and a plurality of digital channel unit slots, each diital channel unit slot coupled to said backplane, said backplane coupled to multiple telephone company PCM or PAM lines;

a channel unit in at least one of said digital channel unit slots, said channel unit comprising a multiplexing circuit for converting signals on said PCM or PAM lines to multiplexed, full duplex digital signals for transmission and reception over a single twisted pair; and a remote terminal at a subscriber location, said remote terminal converting said multiplexed, full duplex digital signals on said single twisted pair to subscriber service for at least two analog, 64 kbits/sec telephone lines at said subscriber location.

2. The system as recited in claim 1 wherein said PCM or PAM lines are T1 lines.

3. The system as recited in claim 1 wherein said PCM or PAM lines are E1 lines.

4. The system as recited in claim 2 wherein four of said T1 lines are input to said subscriber line carrier for generation of 96 subscriber lines.

5. The system as recited in claim 1 further comprising other channel units in said subscriber line carrier unit, said other channel units outputting analog signals to other subscribers over analog twisted pairs.

6. The system as recited in claim 1 wherein said multiplexed full duplex signals are 2B1Q signals.

7. The system as recited in claim 1 wherein said multiplexed full duplex signals are 4B3T signals.

8. The system as recited in claim 1 wherein said subscriber line carrier unit is coupled to a subscriber line central office unit, said subscriber line central office unit inputting analog signals from a central office switch, and outputting said PCM or PAM lines.

9. The system as recited in claim 1 wherein said channel unit comprises:

an interface circuit for interfacing to said backplane of said subscriber line carrier unit;

a first circuit coupled to said interface circuit for inputting segments of T1 signals and outputting duplexed digital time multiplexed signals;

a second circuit coupled to said first circuit for inputting said duplexed digital time multiplexed signals and outputting transmit digital signals;

a third circuit coupled to said second circuit for inputting said transmit digital signals and outputting quaternary signals; and a line transmission circuit for inputting said quaternary signals and outputting two-wire quaternary signals.

10. The system as recited in claim 9 further comprising a programmable logic device for generating and receiving control signals to and from said backplane.

11. A method of using a subscriber line carrier, said subscriber line carrier comprising a plurality of digital channel unit slots, said digital channel unit slots adapted to receive channel units, said channel units adapted to each generate multiple analog telephony signals and transmit each of said multiple analog telephony line signals over corresponding twisted pair wires, said method comprising the step of installing a multiplex channel unit, said multiplex channel unit transmitting and receiving multiple telephony line signals between said channel unit slots and a subscriber location over a single twisted pair; and converting said multiple telephony line signals to multiple, 64 kbits/sec analog services provided over multiple twisted pairs at said subscriber location.

12. The method as recited in claim 11 wherein said subscriber line carrier is a SLC 96 and said SLC 96 inputs multiple T1 signals.

13. The method as recited in claim 11 wherein said channel units are adapted to generate two analog telephony line signals for transmission over two corresponding twisted pair wires, and said multiplex channel units are adapted to transmit two telephony line signals over said twisted pair.

14. The method as recited in claim 11 wherein said multiple telephony line signals are transmitted using a 2B1Q line coding standard.

15. The method as recited in claim 11 wherein said multiple telephony line signals are transmitted using a 4B3T line coding standard.

16. The method as recited in claim 12 wherein said T1 signals are generated from multiple analog signals at a central office switch.

17. In a system for single channel transmission from telephone company equipment at a first location to a subscriber location over a twisted pair, a method of converting said system to a system for multiple channel transmission over said twisted pair comprising:
   a) installing a multiplexer in the telephone company equipment at the first location, said multiplexer:
      i) inputting multiple incoming backplane digital signals from a backplane of the telephone company equipment and outputting multiple outgoing backplane digital signals to the backplane of the telephone company equipment;
      ii) converting said multiple incoming backplane digital signals to a multiplexed outgoing 2B1Q digital signal and converting a multiplexed incoming 2B1Q digital signal to said multiple outgoing backplane signals; and
      iii) transmitting said multiplexed outgoing 2B1Q digital signal over said twisted pair to said subscriber location and receiving said multiplexed incoming 2B1Q digital signal; and
   b) installing a remote terminal at said subscriber location, said remote terminal:
      i) inputting said multiplexed outgoing 2B1Q digital signal from said twisted pair and outputting said multiplexed incoming 2B1Q digital signal on said twisted pair;
      ii) converting said multiplexed outgoing 2B1Q digital signal to multiple outgoing analog 64 kbits/sec subscriber signals and converting multiple incoming analog 64 kbits/sec subscriber signals to said multiplexed incoming digital signal; and
      iii) transmitting said multiple outgoing analog 64 kbits/sec subscriber signals to said subscriber equipment and receiving said multiple incoming analog 64 kbits/sec subscriber signals from said subscriber equipment.

18. The method as recited in claim 17 wherein said multiplexed outgoing digital signal and said multiplexed incoming digital signal comprise quaternary signals.

19. The method as recited in claim 17 wherein the telephone company equipment comprises a SLC-96 remote terminal and installing said multiplexer comprises plugging in said multiplexer into a channel unit shelf space of the SLC-96 remote terminal.

20. The method as recited in claim 19 wherein said single channel and said multiple channels comprise VF channels, and wherein said multiple outgoing subscriber signals and said multiple incoming subscriber signals comprise analog signals.

21. The method as recited in claim 20 wherein said multiple incoming backplane signals and said multiple outgoing backplane signals comprise pulse amplitude modulation (PAM) signals.

22. The method as recited in claim 20 wherein said multiple incoming backplane signals and said multiple outgoing backplane signals comprise pulse code modulation (PCM) signals.

23. The method as recited in claim 19 wherein said single channel and said multiple channels comprise 4-wire digital data service (DDS) channels, and wherein said multiple incoming backplane signals and said multiple outgoing backplane signals comprise digital data bus signals.

24. A method of converting a system providing telephone line service over a single twisted pair into a system providing multiple telephone line service over said single twisted pair, said method comprising:

providing a remote terminal at a subscriber location, said remote terminal including electronics in an enclosure, said electronics coupled to a first twisted pair, a second twisted pair, and a third twisted pair, wherein said enclosure is constructed as a door; and installing said remote terminal, said installing step including electrically connecting said first twisted pair and said single twisted pair to set up a digital subscriber loop, electrically connecting said second twisted pair to a first customer subscriber wiring to a provide a first telephone line service, and electrically connecting said third twisted pair to a second customer subscriber wiring to provide a second telephone line service.

25. The method as recited in claim 24, said method further comprising:

installing a multiplexer at a telephone company location coupled to said single twisted pair.

26. The method as recited in claim 25, wherein said telephone company location is a SLC-96 remote terminal.

27. The method as recited in claim 24, wherein said installing step further includes using said enclosure as a cover to a network interface device (NID).

28. The method as recited in claim 24, wherein said installing step further includes removing an existing door from said network interface device.

29. The method as recited in claim 24, wherein said first and second telephone line services provide voice signals.

30. The method as recited in claim 24, wherein said first and second telephone line services provide data signals.

31. The method as recited in claim 24, wherein said first telephone line service provides voice signals and said second telephone line service provides data signals.

32. The method as recited in claim 24, wherein said remote terminal with said electronics may be replaced by a like remote terminal with different electronics to change the services provided.

33. The method as recited in claim 24, wherein the remote terminal is environmentally protected.

34. The method as recited in claim 24, wherein said remote terminal further includes a base coupled to said enclosure.

* * * * *